United States Patent [19]

Sridhar

[11] Patent Number: 5,063,023

[45] Date of Patent: Nov. 5, 1991

[54] CORROSION RESISTANT NI- CR- SI- CU ALLOYS

[75] Inventor: Narasi Sridhar, Carmel, Ind.

[73] Assignee: Haynes International, Inc., Kokomo, Ind.

[21] Appl. No.: 437,707

[22] Filed: Nov. 17, 1989

[51] Int. Cl.$^5$ ............................................. C22C 19/05
[52] U.S. Cl. ...................................... 420/442; 420/445; 420/446; 420/448; 420/450; 420/451; 420/453; 420/454
[58] Field of Search ............... 420/442, 445, 446, 448, 420/450, 451-454; 148/427, 428

[56] References Cited

U.S. PATENT DOCUMENTS

| | | | | |
|---|---|---|---|---|
| 2,103,855 | 12/1937 | La Bour | ...... | 75/171 |
| 2,821,474 | 1/1958 | Steinbuch | ...... | 75/171 |
| 2,938,786 | 5/1960 | Johnson | ...... | 75/171 |
| 3,758,296 | 9/1973 | Johnson | ...... | 75/122 |
| 4,033,767 | 7/1977 | Johnson | ...... | 75/170 |
| 4,836,985 | 6/1989 | Culling | ...... | 420/582 |

*Primary Examiner*—R. Dean
*Attorney, Agent, or Firm*—Joseph J. Phillips

[57] ABSTRACT

Disclosed is a nickel-base alloy for use under "super oxidizing" environments, for example, concentrated sulfuric acid, fuming nitric acid, chromium acid and mixtures containing chromic acid. The alloy has good strength and may be precipitation hardened. Its thermal stability and weldability are excellent. The alloy has a high degree of resistance to pitting. A nominal composition contains, in percent by weight, about 20 chromium, about 2 copper, about 2 iron, about 2 molybdenum, about 5 silicon and the balance nickel plus normal impurities.

5 Claims, 1 Drawing Sheet

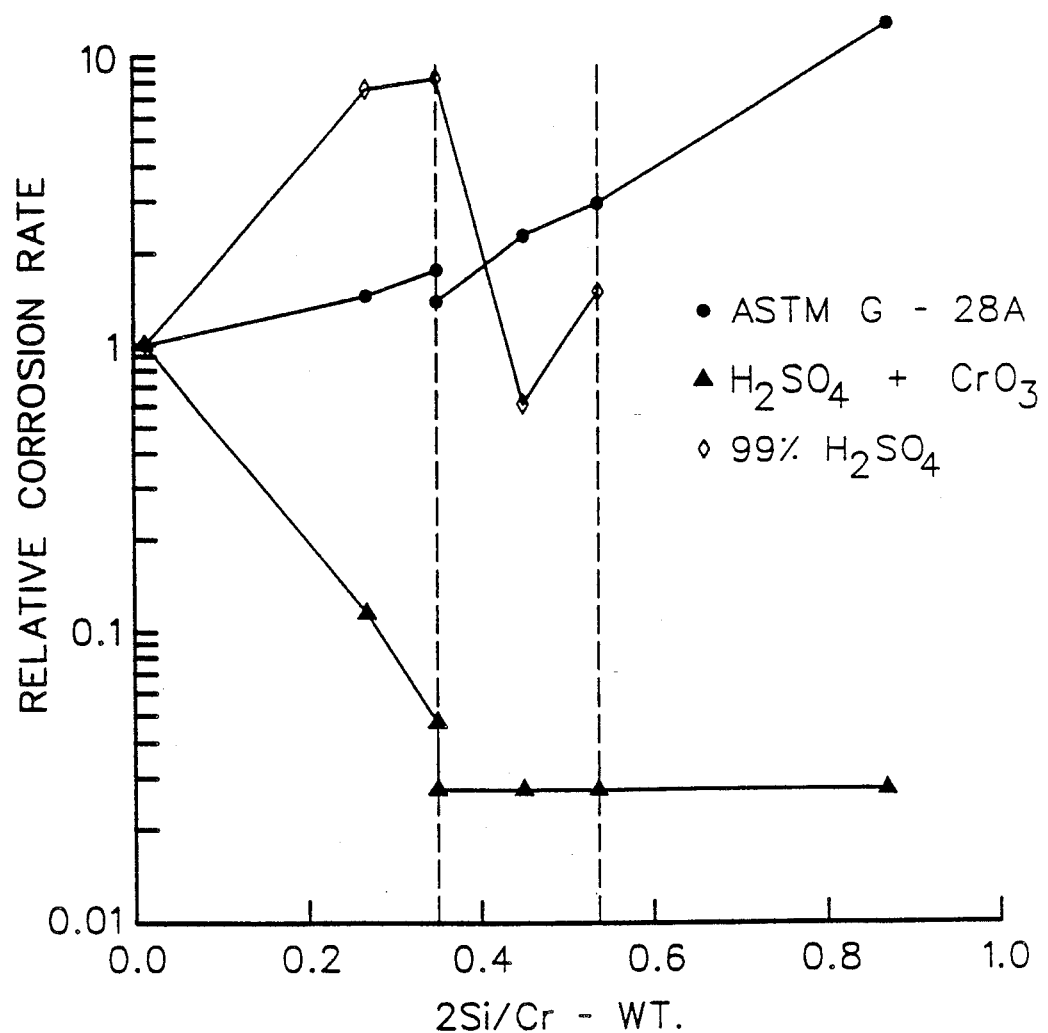

CORROSION RESISTANT NI- CR- SI- CU ALLOYS

AREA OF INTEREST

This invention relates to nickel-base alloys containing chromium, silicon, copper and, optionally, other elements to provide valuable engineering characteristics for use in severe corrosion and high-temperature exposures.

BACKGROUND AND PRIOR ART

Many industrial products and processes are limited because of restraints relating to the mechanical and/or chemical properties of component parts. For example, turbine engines would operate more efficiently if the component parts had longer life at higher temperatures. Also, the processing of products, such as chemicals would be more efficient if the component parts of the processing apparatus were more resistant to corrosion and/or high-temperature exposures.

The nickel-base alloys in the art do not meet all the needs of the industry because of many deficiencies in corrosion and mechanical properties. For this reason, many nickel-base alloys must be designed to meet these needs. The differences among new nickel-base alloys may be slight, or even subtle, as they often must be developed to possess certain combinations of properties as required under specific conditions of use.

Table 1 lists a number of alloys in prior art patents. All compositions given in this specification and in the claims are in percent by weight (wt/o) unless otherwise specified. Each of the alloys generally provides excellent corrosion resistance or excellent weld ductility or excellent Charpy impact strength or excellent age hardening characteristics. Some of the alloys may provide more than one of these properties; however, none provides a good combination of all these properties. The compositions of prior art nickel-base alloys in Table 1 nearly all may contain, among other elements, chromium, copper, molybdenum and silicon. For the most part, the alloys are limited for use as castings because of the combined high chromium, silicon, carbon, and copper contents.

There has remained a need for alloys that successfully resist the precipitation of carbide and intermetallic phases while still providing the wide range of corrosion resistance to highly oxidizing conditions in the solution annealed condition. Prior art alloys do not offer sufficient corrosion resistance in some highly oxidizing environments.

OBJECTS OF THIS INVENTION

The principal object of the present invention is to provide nickel-base alloys with excellent corrosion resistance to oxidizing environments in the annealed, welded and thermally aged conditions.

Another object is to provide such alloys that not only possess excellent corrosion resistance but which also have outstanding thermal stability and resistance to loss of mechanical properties as a result of structural changes during aging or thermo-mechanically forming.

Still another object is to provide alloys resistant to stress-corrosion cracking in chloride environment in the precipitation-strengthened condition.

It is a further object to provide solid solution nickel-base alloys which can be readily produced in wrought or cast forms and fabricated and are homogeneous in the state of equilibrium.

BRIEF DESCRIPTION OF THE INVENTION

In accordance with the present invention, the above objectives and advantages are obtained by carefully controlling the composition of the essential elements within the broad range set forth in Table 2. All experimental alloys contained the optional elements, aluminum, carbon, columbium, cobalt, iron, nitrogen, titanium and tungsten essentially within the broad range as presented in Table 2. In most cases deliberate additions of these elements were not made and their contents are within normal impurity levels.

The alloys are resistant to many diverse oxidizing acids in a variety of concentrations and temperatures. They have excellent weld ductility as weld bend test results will show. The thermal stability, as shown by Charpy impact test results, is very favorable. The alloys have good age hardening properties. The alloys are also resistant to stress-corrosion cracking in the age-hardened condition.

EXAMPLES AND TEST RESULTS

Corrosion

A series of tests was conducted to determine the effects of chromium, silicon, molybdenum and copper on corrosion. The beneficial effects of combinations of chromium and silicon to resist highly oxidizing solutions such as concentrated sulfuric acid have been shown in many patents. However, it was discovered that the levels of silicon required are quite critical and depends on the chromium level. As shown in Table 3, for highly oxidizing environments (environment B in Table 3), the higher the silicon, the more resistant the alloy. In slightly less oxidizing environments (environments A and C), the corrosion rate goes through a maximum with silicon, with small amounts of silicon (up to 3%) detrimental and higher amounts being beneficial. In even lower oxidizing acids such as environment D in Table 3, silicon is detrimental and chromium is beneficial. Hence the chromium-to-silicon ratio has to fit within a certain interval for the alloy to possess resistance to a wide variety of environments. These opposing effects of Si and Cr are presented in FIG. 1 as relative corrosion rate vs. 2 Si/Cr ratio (the 2 to take into effect the higher efficiency of silicon and lower atomic weight). From FIG. 1, it seems that this ratio would fall between 0.3–0.6 for overall resistance to a wide variety of oxidants. This ratio is in addition to limits on Cr and Si.

Additionally, the beneficial effects of Mo and Cu can be seen in 90% $H_2SO_4$ (environment C). Copper is especially beneficial in this environment. However, too high a level of copper (above 3.5%) is detrimental to pitting resistance and processability. For optimum benefits, a maximum of 3.0% copper is recommended; about 2% is preferred.

Weld Ductility

Alloys of this class must have a high degree of weldability. A series of tests was conducted as shown in Table 4. Weld bend ductility was determined by the well-known 2-T Radius Bend Test. Results of the test indicate that the ratio of Ni to Fe must be over 1.0. Ratios less than 1 define iron-base alloys, for example, 20 type steels and duplex steel which do not have the corrosion resistance to a varied combination of acids.

Silicon in stainless steels and some Ni alloys is notorious for creating weld cracking problems and lowering weld ductility. However, the alloys in this invention are surprisingly resistant to these problems provided the nickel content is above a certain range. This is a major point of this invention. The weld bend test results are shown in Table 4. It can be seen from Table 4 that if the nickel content is low (less than about 12%) or if the nickel content is above a certain level (about 25%), the welds pass the 2-T bend test. Below 12% Ni (in the 20 Cr, 12 Co, 5 Si alloys), the alloy has some ferrite in the microstructure and it is well-known that small amounts of ferrite at the beginning of the weld solidification is beneficial for ductility. However, this condition is not found in homogeneous solid solution nickel-base alloys of this invention. While a small amount of ferrite in stainless steel is beneficial for resisting cracking during welding, ferrite can lead to enhanced cracking during exposure to temperatures of 1600° F. which are encountered during hot forming operations. However, the high Ni alloys are resistant to cracking in these temperatures also.

Thermal Stability

The thermal stability of a series of alloys was impact tested after exposure at 1600° F. for six minutes and thirty minutes. Results of the test are shown in Table 5. The data shown an alloy of this invention (Alloy 5-8) to have adequate impact toughness although the sample was subsize. Alloy 5-9 of the invention was exposed at 1600° F. for six minutes and one hour. Both alloys had good impact toughness when compared to the alloys with a (20-Fe×Si-3) value less than 5. Iron must be less than 19%.

Age Hardening

A further benefit of these alloys is the ability to be substantially hardened by heat treatment. Silicon acts similarly to Al and Ti, but there are considerable differences. The aging temperature required to induce hardening is lower for the Si alloy rendering them easier to age-harden. The iron content has to be less than about 19% and the silicon content has to be greater than 3%. The number (20-Fe)×(Si-3) has to be greater than 5 for hardening to be observed. The data are shown in Table 6.

The examples and test results define the invention. Test data show the alloy of this invention has a unique combination of engineering properties. The ratios and composition ranges have been established as identifying the alloy in a pragmatic manner. Although the exact mechanism of the invention is not completely understood it has been determined that the ratios as established will yield best results. Thus, the invention requires not only the specific composition ranges for the critical elements but also the ratios among certain elements as disclosed.

Experimental examples of the alloy of this invention were made in the form of sheet, castings, welding materials and the like with no processing difficulties. The alloy of this invention may be produced in the form of cast, wrought and powder products as well as articles for use in welding processes and weldments.

It will be apparent to those skilled in the art that the novel principles of the invention disclosed herein in connection with specific examples thereof will support various other modifications and applications of the same. It is accordingly desired that, in construing the breadth of the appended claims, they shall not be limited to the specific examples of the invention described.

TABLE 1

Prior Art Alloys.
Composition, in Weight Percent

|  | 2,103,855 | 2,821,474 | 3,758,296 | 4,033,767 | 2,938,786 | 4,836,985 |
|---|---|---|---|---|---|---|
| Al | — | — | — | — | — | — |
| C | .30 | — | .05–.25 | .05–.25 | up to .03 | up to .11 |
| Cb | — | — | — | — | — | — |
| Cr | 20–30 | 9–30 | 30–34 | 30–35 | 19–26 | 31–33 |
| Co max. | — | — | 4–7.5 | 4–7.5 | — | 1.2 |
| Cu | 3.5–7 | .05–5 | 2.5–8 | 2.5–8 | 4–7 | 2.7–4 |
| Fe | 2–12 | — | up to 25 | 3–25 | up to 10 | Bal. up to 23.0 |
| Mn | 1 | — | 1–3.5 | 1–3.5 | up to 1.5 | up to 2.0 |
| Mo | 2–6 | — | 4–5.25 | 0–3 | 5–9 | 4–5.2 |
| N | — | — | — | — | — | .04–.62 |
| Ni* | 50–55 | Bal. | 26–48 | 30–48 | 46–69 | 36–40.5 |
| Si | 3.5–5 | 6–7 | up to 4.0 | 0–6 | 1.5–7.5 | 2.5–6 |
| Ti | — | — | — | — | — | — |
| W | 1–3 | — | — | — | — | up to .07 |
| B | — | — | up to .10 | up to .10 | .025–.55 | — |
| Si + Mo | — | — | — | up to 4 | — | — |
| Impurities | — | — | — | — | Bal. up to .25 | — |
| | | | | (wrought) | | |
| Ti + Cb + Ta | — | — | — | — | — | up to .05 |

TABLE 2

Alloys of this Invention.
Composition, w/o

| Broad Range | Intermediate Range | Preferred Range | Typical Alloys | | | | |
|---|---|---|---|---|---|---|---|
| | | | alloy 3-9 | alloy 5-9 | alloy 6-7 | alloy 6-8 | alloy 6-13 |
| Al: up to 1.5% | up to 0.5 | up to .3 | — | — | — | — | — |
| C: up to 0.06% | up to 0.04 | up to .02 | — | — | — | — | — |

TABLE 2-continued

| | Alloys of this Invention. Composition, w/o | | | | | | |
|---|---|---|---|---|---|---|---|
| Broad Range | Intermediate Range | Preferred Range | Typical Alloys | | | | |
| | | | alloy 3-9 | alloy 5-9 | alloy 6-7 | alloy 6-8 | alloy 6-13 |
| Cb: up to 3% | up to 1.0 | up to .3 | — | — | — | — | — |
| Cr: 11–29% | 16–23 | 19–21 | 20 | 19 | 25 | 22 | 22 |
| Co: up to 20% | up to 10 | up to 5 | — | — | — | — | — |
| Cu: 1–3.5% | 1–3 | 1.5–2.5 | 2.3 | 2.3 | 2 | 1.8 | 2.2 |
| Fe: up to 19% | 1–10 | 3–7 | — | 4.6 | 1.8 | 1.8 | 0.12 |
| Mn: up to 2% | up to 1 | up to 0.5 | — | — | — | — | — |
| Mo: 1–6.5% | 1–5 | 1.5–3 | 3.0 | 1.5 | 3.00 | 3 | 2.8 |
| N: up to 0.2% | up to 0.1 | up to .03 | — | — | — | — | — |
| Ni: Balance* | Bal. | Bal. | Bal. | Bal. | Bal. | Bal. | Bal. |
| Si: 3.5–6.5% | 4–6 | 4.5–5.5 | 5.0 | 5.2 | 5.00 | 5.2 | 5.0 |
| Ti: up to 2% | up to 1 | up to 0.2 | — | — | — | — | — |
| W: up to 2.5% | up to 1 | up to 0.5 | — | — | — | — | — |
| 2 Si/Cr: 0.35–0.6 | | | | | | | |
| Ni/Fe: Greater than 2 | | | | | | | |
| (20-Fe) × (Si-3): Greater than 5 | | | | | | | |

*Nickel plus impurities

TABLE 3

The Effects of Cr, Si, Mo, and Cu on Corrosion in Various Oxidizing Environments.

| ALLOY NO. | Cr | Fe | Si | Mo | W | Cu | Corrosion Rate, mils/year | | | |
|---|---|---|---|---|---|---|---|---|---|---|
| | | | | | | | A | B | C | D |
| Effect of Silicon | | | | | | | | | | |
| 3-1 | 21.2 | 0.1 | 0.09 | 0.0 | 0.0 | 0.0 | 2.2 | 108.0 | 123.5 | 8.8 |
| 3-2 | 21.4 | 0.22 | 2.87 | 0.0 | 0.0 | 0.0 | 16.7 | 13.2 | 45.7 | 13.4 |
| 3-3 | 21.5 | 0.11 | 3.79 | 0.0 | 0.0 | 0.0 | 18.3 | 5.9 | 94.3 | 16.6 |
| 3-4 | 21.4 | 0.1 | 4.86 | 0.0 | 0.0 | 0.0 | 1.4 | 2.9 | 97.5 | 21.4 |
| Effect of Mo, W, Cu | | | | | | | | | | |
| 3-5 | 21.2 | 1.91 | 4.92 | 2.8 | 0.0 | 0.0 | 1.8 | 2.1 | 46.5 | 27.2 |
| 3-6 | 21.3 | 0.12 | 4.78 | 2.8 | 2.6 | 0.0 | 1.7 | 1.9 | 78.1 | 34.3 |
| 3-7 | 21.5 | 0.18 | 5.09 | 6.7 | 0 | 0.0 | 2.5 | 5.2 | 79.9 | 33.4 |
| 3-8* | 21.8 | 0.13 | 4.64 | 2.7 | 0 | 2.0 | 0.2 | 1.8 | 6.3 | 28.8 |
| 3-9* | 19.8 | 4.95 | 5.09 | 3.0 | 0 | 2.3 | — | 2.6 | 5.4 | 29.6 |
| 3-10* | 19.1 | 4.6 | 5.22 | 1.5 | 0 | 2.3 | — | 2.6 | 13.4 | 23.4 |
| Effect of Cr | | | | | | | | | | |
| 3-11* | 29.3 | 4.92 | 5.11 | 0.0 | 0 | 2.1 | — | 3.5 | 10.0 | 12.6 |
| 3-12 | 17.6 | 0.1 | 4.79 | 0.0 | 0 | 0.0 | 3.4 | 2.7 | 95.6 | 27.7 |
| 3-13* | 11.9 | 4.95 | 5.19 | 3.0 | 0 | 2.2 | — | 3.0 | 26.0 | 115.0 |
| 3-14* | 21.8 | 4.93 | 6.60 | 2.9 | 0 | 2.1 | — | CRACKED UPON FORGING | | |

Oxidizing Environments
A = 99% H2SO4, 130 C.
B = 30% H2SO4 + 5% CrO3, 79° C.
C = 90% H2SO4, 80° C.
D = 50% H2SO4 + 42 G/L Fe2(SO4)3, Boiling (ASTM G-28A)
*Alloys of this invention

TABLE 4

Effect of Ni, Fe, Si on Weld Bend Ductility.

| ALLOY NO. | Fe | Co | Ni | Si | Cr | Mo | Ni/Fe | Strain | 2-T Radius Bend Test Results |
|---|---|---|---|---|---|---|---|---|---|
| 4-1 | 44.00 | 11.10 | 19.50 | 4.83 | 20.30 | 0.00 | 0.44 | 0.00 | CRACKED, SLIGHT BENDING, 0.25" PLATE |
| 4-2 | 46.40 | 5.90 | 21.70 | 5.11 | 20.40 | 0.00 | 0.47 | 0.00 | CRACKED WHILE WELDING |
| 4-3 | 49.00 | 0.00 | 24.60 | 5.20 | 20.50 | 0.00 | 0.50 | 0.00 | CRACKED DURING WELDING |
| 4-4 | 38.00 | 5.97 | 25.60 | 4.30 | 20.30 | 3.00 | 0.67 | 0.00 | CRACKED, SLIGHT BENDING, 0.25" PLATE |
| 4-5 | 41.00 | 5.90 | 25.10 | 3.10 | 20.00 | 3.10 | 0.61 | 0.00 | CRACKED, SLIGHT BENDING, 0.25" PLATE |
| 4-6 | 55.50 | 5.60 | 12.50 | 4.90 | 21.10 | 0.10 | 0.23 | 1.00 | DID NOT CRACK, 0.5" PLATE |
| 4-7 | 53.00 | 11.80 | 10.00 | 4.10 | 20.40 | 1.40 | 0.19 | | |
| 4-8 | 53.00 | 11.70 | 10.00 | 5.00 | 20.00 | 0.00 | 0.19 | | |
| 4-9 | 0.14 | 0.00 | 74.10 | 5.50 | 19.20 | 0.00 | 529.29 | 1.00 | DID NOT CRACK, 0.5" PLATE |
| 4-10 | 0.14 | 11.60 | 62.50 | 5.80 | 19.70 | 0.00 | 446.43 | 1.00 | DID NOT CRACK, 0.5" PLATE |
| 4-11 | 19.45 | 11.80 | 42.60 | 5.66 | 20.29 | 0.00 | 2.19 | 1.00 | DID NOT CRACK, 0.5" PLATE |
| 4-12* | 4.95 | 0 | 64.73 | 5.09 | 19.78 | 2.96 | 13.08 | 1.00 | DID NOT CRACK, 0.5" PLATE** |

*Alloy of this invention - contains 2.29% copper
**2.5-T Radius Bend Test

TABLE 5

Effects of Ni, Co, Fe, and Si on Thermal Stability.

| ALLOY NO. | Fe | Co | Ni | Si | Cr | Mo | Cu | Ni/Fe | Charpy V-notch Toughness, Ft. Lbs 1600 F./6 MIN | 1600 F./30 MIN |
|---|---|---|---|---|---|---|---|---|---|---|
| 5-1 | 46.40 | 5.90 | 21.70 | 5.11 | 20.40 | 0.00 | — | 0.47 | 7.75 | 4.50 |
| 5-2 | 55.50 | 5.60 | 12.50 | 4.90 | 21.10 | 0.10 | — | 0.23 | 3.25 | 3.25 |
| 5-3 | 53.00 | 11.80 | 10.00 | 4.10 | 20.40 | 1.40 | — | 0.19 | 6.63 | 7.00 |
| 5-4 | 53.00 | 11.70 | 10.00 | 5.00 | 20.00 | 0.00 | — | 0.19 | 5.00 | 4.25 |
| 5-5 | 0.14 | 0.00 | 74.10 | 5.50 | 19.20 | 0.00 | — | 529.29 | 249.00 | 187.00 |
| 5-6 | 0.14 | 11.60 | 62.50 | 5.80 | 19.70 | 0.00 | — | 446.43 | 199.33 | 140.00 |
| 5-7 | 19.45 | 11.80 | 42.60 | 5.66 | 20.29 | 0.00 | — | 2.19 | 147.33 | 94.17 |
| 5-8* | 5.00 | 0.00 | 65.08 | 5.14 | 19.66 | 3.05 | 1.9 | 13.02 | 65.8 | — |
| 5-9* | 4.60 | — | 66.9 | 5.22 | 19.14 | 1.46 | 2.28 | 14.54 | 70.7 | 63.7 (1 hr) |

*Alloys of this invention

TABLE 6

Effect of Fe and Si on Aging Induced Increase in Yield Strength.

| ALLOY NO. | Co | Cr | Fe | Mo | Ni | Cu | Si | (20-Fe) × (Si-3) | Y.S. Increase KSI | Y.S. Annealed | 0.2% Y.S., Ksi 1100 F./24 HRS |
|---|---|---|---|---|---|---|---|---|---|---|---|
| 6-1 | 0.00 | 21.60 | 0.10 | 0.00 | 77.98 | — | 0.10 | −57.71 | 3.50 | 33.80 | 37.30 |
| 6-2 | 0.00 | 21.76 | 0.22 | 0.00 | 74.43 | — | 3.14 | 2.77 | 0.00 | 36.05 | 35.60 |
| 6-3 | 11.76 | 20.29 | 19.45 | 0.00 | 42.64 | — | 5.66 | 1.46 | 4.00 | 35.00 | 39.00 |
| 6-4 | 0.00 | 21.76 | 11.62 | 0.00 | 60.72 | — | 5.70 | 22.63 | 60.73 | 35.30 | 96.03 |
| 6-5* | 0.00 | 21.68 | 9.37 | 2.99 | 55.91 | 2.1 | 4.91 | 20.30 | 56.90 | 52.60 | 109.50 |
| 6-6 | 0.00 | 21.55 | 4.78 | 0.00 | 67.62 | — | 5.85 | 43.38 | 71.28 | 34.42 | 105.70 |
| 6-7* | 0.00 | 24.73 | 1.75 | 3.00 | 60.88 | 1.9 | 5.00 | 36.50 | 61.20 | 56.70 | 117.90 |
| 6-8* | 0.00 | 21.73 | 1.81 | 2.98 | 63.90 | 1.8 | 5.22 | 40.38 | 82.50 | 52.30 | 134.80 |
| 6-9 | 0.00 | 21.30 | 1.87 | 2.73 | 67.95 | — | 5.89 | 52.40 | 85.51 | 51.04 | 136.55 |
| 6-10 | 0.00 | 21.68 | 0.19 | 6.56 | 65.68 | — | 5.66 | 52.69 | 79.33 | 56.88 | 136.21 |
| 6-11 | 0.00 | 19.15 | 0.14 | 0.49 | 74.13 | — | 5.48 | 49.25 | 71.00 | 35.00 | 106.00 |
| 6-12 | 11.64 | 19.68 | 0.14 | 0.00 | 62.49 | — | 5.83 | 56.20 | 64.00 | 35.00 | 99.00 |
| 6-13* | 0.00 | 21.99 | 0.12 | 2.84 | 67.60 | 2.2 | 5.02 | 40.16 | 82.32 | 47.02 | 129.34 |
| 6-14 | 0.00 | 21.43 | 0.11 | 2.78 | 67.52 | — | 5.77 | 55.10 | 85.15 | 55.34 | 140.49 |
| 6-15 | 0.00 | 23.96 | 0.11 | 0.00 | 69.87 | — | 5.84 | 56.49 | 63.19 | 37.20 | 100.39 |
| 6-16 | 0.00 | 21.40 | 0.11 | 0.00 | 72.58 | — | 5.66 | 52.91 | 76.52 | 41.26 | 117.78 |
| 6-17 | 0.00 | 21.73 | 0.11 | 0.00 | 73.63 | — | 4.29 | 25.66 | 51.79 | 35.66 | 87.45 |
| 6-18 | 0.00 | 17.52 | 0.10 | 0.00 | 76.34 | — | 5.82 | 56.12 | 76.03 | 37.14 | 113.17 |

*Y.S. INCREASE = Y.S. (AGED) - Y.S. (ANNEALED)
*Alloys of this invention

What is claimed is:

1. A nickel-base alloy consisting essentially of, in weight percent, up to 1.5 aluminum, up to 0.06 carbon, up to 3 columbium, 11 to 29 chromium, up to 20 cobalt, 1 to 3 copper, up to 19 iron, up to 2 manganese, 1 to 6.5 molybdenum, up to 0.2 nitrogen, 3.5 to 6.5 silicon, up to 2 titanium, up to 2.5 tungsten and the balance nickel and normal impurities wherein the value (20-Fe)×(Si-3) is greater than 5.

2. The alloy of claim 1 containing up to 0.5 aluminum, up to 0.04 carbon, up to 1 columbium, 16 to 23 chromium, up to 10 cobalt, 1 to 3 copper, 1 to 10 iron, up to 1 manganese, 1 to 5 molybdenum, up to 0.1 nitrogen, 4 to 6 silicon, up to 1 titanium, and up to 1 tungsten.

3. The alloy of claim 1 containing up to 0.3 aluminum, up to 0.02 carbon, up to 0.3 columbium, 19 to 21 chromium, up to 5 cobalt, 1.5 to 2.5 copper, 3 to 7 iron, up to 0.5 manganese, 1.5 to 3 molybdenum, up to 0.03 nitrogen, 4.5 to 5.5 silicon, up to 0.2 titanium and up to 0.5 tungsten.

4. The alloy of claim 1 wherein the value 2 Si/Cr is between 0.35 and 0.6 and the value Ni/Fe is greater than 2 to provide improved resistance to corrosion and high temperature exposures.

5. The alloy of claim 1 in the form of wrought, cast, powder or welding materials.

* * * * *